Feb. 23, 1965 C. B. HEFFRON 3,171,083

VACUUM TUBE HEATER IDLING CIRCUIT

Filed April 16, 1962

INVENTOR

Charles B. Heffron

BY

Charles F. Renz

ATTORNEY

United States Patent Office 3,171,083

Patented Feb. 23, 1965

3,171,083

VACUUM TUBE HEATER IDLING CIRCUIT

Charles B. Heffron, Metuchen, N.J., assignor to Westinghouse Electric Corporation, East Pittsburgh, Pa., a corporation of Pennsylvania Filed Apr. 16, 1962, Ser. No. 187,817
2 Claims. (Cl. 328—260)

Figures 1, 2:
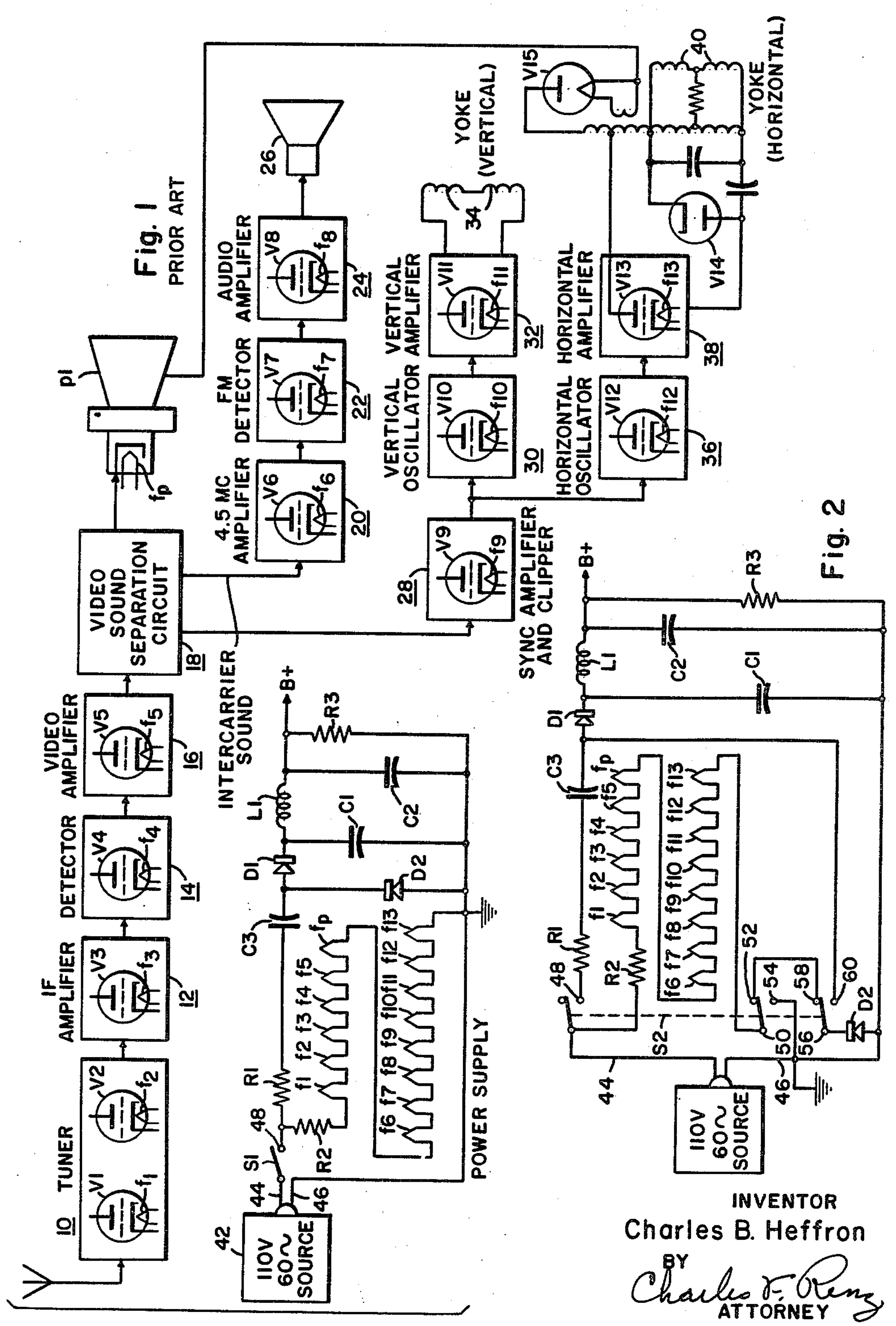
Fig. 1 PRIOR ART, Fig. 2

This invention relates to a power supply for a television or radio receiver and more particularly to a power supply circuit for a television or radio receiver that applies low level power to the heaters of the receiver tubes when the set is turned off.

It is well known that the initial current surges through heaters of thermionic or hot cathode type tubes when applied at room temperature, is detrimental to the life of the tubes. This is primarily due to the fact that most filaments or heaters are made of material which have positive temperature coefficients of resistance. Thus when the initial surge of current is applied to the heaters, at room temperature, the resistance of the heaters is quite low and hence the current is quite high. In addition, the actual sudden expansion of the heater caused by sudden heating of the heaters to the normal operating temperature, causes crystallization and is detrimental to the life of the tubes. Each time a radio or television receiver is turned on or off this detrimental thermal expansion or contraction occurs so as to effectively shorten the life of the tube each time the set is turned off or on.

In patent application Serial No. 140,801, filed September 26, 1961, entitled "Television Receiver Power Supply" by George C. Sziklai, there is disclosed a transformerless power supply for a television receiver wherein the power supply produces a voltage approximately equal to the line voltage and wherein the rectifier of the power supply is switched in series with the filament circuit and the A.C. power, when the set is turned off. In so doing the filaments will have only half their normal power applied thereto, when the set is turned off, so as to overcome the above detrimental effects to the tube life of the television receiver tubes caused by turning the set off and on. In addition when the set is turned on the plate supply is actuated and almost instantly the picture appears on the television set and the television sound is heard.

In a conventional television receiver the video signal applied to the picture tube, that is the video output, and the outputs of the horizontal and vertical sweep circuits, must be of relatively large power outputs so as to provide satisfactory driving current for the image display device or the picture tube. If the power supply for the television receiver is not capable of producing plate voltages in the order of 200 to 250 volts, the current required through these stages for proper or optimum power output will require a plate current of the magnitude which either will result in operating tubes in an undesirable operating range of the tube or will require the use of more expensive unique tubes. For this reason it is desirable to have a power supply for the television receiver which is capable of producing D.C. voltages between 200 and 250 volts, so that conventional tubes can be employed to produce the optimum power required and in the optimum operating range of the tube. Due to this, power supplies for television sets of the transformerless type, are employed which are "voltage doublers" that produce a direct current voltage supply which has a voltage of approximately twice the alternating current line voltage. That is they will produce voltages between 200 and 300 volts. In sets utilizing the voltage doubler power supply, it is also desirable to have an idler or a reduced power on the filaments when the set is turned off to overcome the above-mentioned detrimental effects due to the turning off and on of the television set.

In the preferred embodiment of the present invention a power supply for a television or radio receiver is disclosed which provides a plate voltage for the tubes that is substantially greater than the alternating current line voltage and when switched off by the off-on switch of the television receiver will provide the filaments with a relatively low filament current or power.

Accordingly, it is an object of the invention to provide a new and improved power supply for a radio or television receiver, which will effect a relatively low idle power to the filaments during the off position while increasing the power to provide the proper operating temperature of the filaments when the set is turned on.

Another object of the invention is the provision of a power supply for a radio or television receiver which will produce a voltage to be utilized by the tubes as a plate voltage, which is substantially greater than the alternating current input voltage and will also apply a relatively low idle power to the filaments when the set is turned off.

A further object of the invention is to provide a power supply for a radio or television receiver which is capable of producing a direct current voltage supply having a voltage of substantially greater than the line voltage and when the set is turned off the plate voltage will be removed from the tubes therein and a reduced power will be applied to the filaments of the tubes.

Other objects and advantages of the invention will become apparent by reading of the following specification and examination of the attached drawings in which:

FIG. 1 is a schematic diagram with parts in block form of a conventional television receiver; and FIG. 2 is a schematic diagram of a power supply circuit emboding the invention to be used with a television receiver illustrated in FIG. 1.

The television receiver illustrated in FIG. 1 is of a conventional type and for this reason will not be described in detail. Generally the receiver includes a tuner 10 having, for example, a radio frequency amplifier utilizing a tube V1 having a heater $f_1$, which tuner receives both the sound and picture radio frequency carriers from the antenna and amplifies them. It will be understood that the vacuum tubes illustrated in the drawing may comprise one or more tubes but are shown as one tube for purposes of illustration only. The radio frequency amplifier V1 amplifies the television sound and picture signals and applies them to a mixer utilizing a tube V2 having a heater $f_2$. The oscillator mixer utilizing tube V2, heterodynes the signal from the radio frequency amplifier so that the output thereof includes an intermediate frequency picture carrier and an intermediate frequency sound carrier. In accordance with present day United States standards these carriers are separated by 4.5 megacycles. The picture and sound intermediate frequencies are applied to an intermediate frequency amplifier 12 having a tube V3 with a filament or heater $f_3$. It will be understood that generally there is more than one intermediate frequency amplifier. However, for illustrative purposes only one amplifier is shown. After the picture and sound intermediate frequency carriers are amplified by the amplifier 12, they are applied to a second detector 14, having a tube V4 with a heater $f_4$, to produce a demodulated wave which contains the amplitude modulation of the video wave. In addition, the picture and sound intermediate frequency waves are heterodyned to provide a 4.5 megacycle intercarrier sound signal. These signals are then applied to a video amplifier 16 having a tube V5 with a heater $f_5$, the output circuit of which is a video sound separation circuit 18 which separates the video and the 4.5 megacycle intercarrier sound signal. The separated video signals are applied to the cathode or grid of an image producing cathode ray picture tube P1 having a heater $f_p$.

The intercarrier sound signal is applied to a 4.5 megacycle amplifier 20 which utilizes a vacuum tube V6, having a heater $f_6$, to amplify the intercarrier sound wave. The output of the 4.5 megacycle amplifier 20, is applied to a frequency modulation detector 22 utilizing a vacuum tube V7 having a heater $f_7$. The audio signal from detector 22 is amplified by an audio amplifier 24 which utilizes a vacuum tube V8 having a heater $f_8$. The output of the audio amplifier 24 is applied to a sound reproducing means such as a speaker 26.

The video signal from the separation circuit 18 is fed to the SYNC amplifier and clipper 28 utilizing a vacuum tube V9 having a heater $f_9$ to amplify the video signal and to separate the synchronizing pulses, by limiting action or clipping action of the video signal. The horizontal synchronizing pulses are rather short duration having a repetition rate of approximately 15 kilocycles per second. In addition, longer duration vertical synchronizing pulses are produced having a repetition rate of 60 cycles per second.

The vertical SYNC pulses are applied to the vertical oscillator 30. Oscillator 30 is actuated by these vertical SYNC pulses to produce a sawtooth waveform and includes a vacuum tube V10 having heater filaments $f_{10}$. The sawtooth waveforms are further amplified by the vertical amplifier 32 having a vacuum tube V11 with heater $f_{11}$. The amplified sawtooth waveform is then applied to vertical yoke coils 34 to provide the vertical deflection on the cathode ray tube.

The ouput of the SYNC amplifier clipper 28 is also applied to the horizontal oscillator 36 which includes a vacuum tube V12 having heater filaments $f_{12}$. This oscillator is triggered by the horizontal SYNC pulses to produce a sawtooth voltage waveform during the time between each SYNC pulse which have a repetition rate of 15.75 kc. per second. This sawtooth waveform is further amplified by the horizontal amplifier 38 having a vacuum tube V13 with a heater $f_{13}$. A portion of this sawtooth waveform is developed in the horizontal deflection coils 40 to provide the horizontal deflection for the cathode ray tube P1. A flyback or damper tube V14 is employed to permit class C operation of vacuum tube V13 and improve the deflection efficiency, as described in U.S. Patent No. 2,428,606. A portion of this sawtooth current waveform is applied to the yoke coils 40 to sweep the cathode ray beam in a horizontal direction. Another portion of this wave increased by use of the transformer windings is providing a large positive pulse rectified by the diode V15 and applied to the accelerator electrode of the cathode ray picture tube P1 thus providing the high voltage for the picture tube.

The television receiver described above and shown in FIG. 1 is a conventional television receiver and as such forms no part of the present invention. As stated above, in order to employ generally available vacuum tubes at their optimum current rating to produce adequate power in various portions of the circuit such as the horizontal and vertical sweep circuits and the video output circuit, it is necessary to provide a plate voltage of between 200 and 300 volts. In a transformerless power supply, hence, it has been found desirable in the past to employ a so-called "voltage doubler power supply." Such a power supply will produce a voltage of approximately twice the voltage of the A.C. supply source without a power transformer. A typical such supply is illustrated in FIG. 1 which shows an alternating current voltage supply 42 into which the A.C. outlet plug of the television receiver is plugged with two terminal leads 44 and 46 extending therefrom. Connected to the terminal lead 44 is an on-off switch S1 having contacts 48 which when opened will completely disable the power supply and render the set inactive. Connected between one of the contacts 48 and the ground lead 46, is a filament circuit which has in series a limiting resistor R2 and the filaments of all the vacuum tubes of the television receiver as well as the filament of the picture tube namely, $f_1$, $f_2$, $f_3$, $f_4$, $f_p$, $f_5$, $f_6$, $f_7$, $f_8$, $f_9$, $f_{10}$, $f_{11}$, $f_{12}$ and $f_{13}$ so that when the switch S1 is closed all the filaments of the vacuum tubes and the filament of the cathode ray tube P1 as well as the limiting resistor R2 are connected directly across the alternating current voltage supply 42 to thereby provide sufficient current through the filaments to enable emission of electrons of the cathodes. Connected in series with the switch S1 is a surge current limiting resistor R1 and a capacitor C3. Connected between the capacitor C3 and the lead 46 is a rectifier D2. As will be explained the diode D2 and the capacitor C3 are effective to store current and provide an additional voltage so as to double the voltage supplied at the A.C. current source. The capacitor C3 and the cathode of the diode or rectifier D2, are connected to the anode of a rectifier D1. Connected between the cathode of diode D1 and the ground lead 46 is a filter network in the form of a choke L1 placed between two filter capacitors C1 and C2. This filter operates to remove the A.C. ripple from the rectified D.C. supplied through the diode D1. The output of this power supply is connected to the B+ connections or plate connections of the vacuum tubes illustrated in FIG. 1 so as to provide the required relatively high plate voltage thereto.

In the operation of the conventional voltage doubler power supply illustrated in FIG. 1, with contacts 48 closed, when the alternating signal on lead 44 is negative going the charging current will flow from the supply 42 through line 46, rectifier diode D2, capacitor C3, resistor R1 and 44 until capacitor C3 becomes charged to nearly the peak potential of the A.C. voltage supply 42. During the next half cycle the charge on capacitor C3 adds its potential to that of the supply 42, and current flows from the supply 42 through line 44, resistor R1, capacitor C3, rectifier diode D1, the filter and load consisting of L1, C1 C2 and R2, and line 46 to charge capacitor C1 to a potential nearly equal to that of the voltage supply peak plus that across capacitor C3. Thus the output voltage is nearly equal to double the peak of the supply voltage. The operation of this conventional voltage doubler results in the capacitor C3 acting to provide effectively two voltage sources in series which supply the energy therefrom through the rectifier D1.

In the embodiment of the invention illustrated in FIG. 2, the heretofore known voltage doubler power supply is converted by a simple switch S2 so that when the set is turned off by the switch S2, as shown in FIG. 2, relatively low power will be applied to the filaments to avoid detrimental interface effects on the cathode as described above. In the embodiment of the power supply illustrated in FIG. 2 the rectifier D2 is switched in and out of the filament circuit so that in the off position of the switch S2 a pulsating direct current will be applied to the filaments so that approximately half the power is supplied to the filaments. The extra contacts added on to the switch include contact 50 which is electrically connected to the filaments. Additional contacts in this switch are contacts 52 and 54 with contact 54 being connected to the ground lead 46 and contact 52 being connected to another contact 58. In the embodiment of the invention illustrated in FIG. 2, the switch S2 is in its off position with contact 50 being connected to contact 52. In the on position, contact 50 will be connected to contact 54 so that the filament circuit will have the full power from the alternating current voltage supply 42 being applied therethrough.

The other switching elements involved are contact 60 which is connected to the anode of diode D1 and also the capacitor C3. The cathode of diode D2 is connected to a reference point 56. As shown in FIG. 2 in the off position the reference point 56, that is the cathode of D2 will be connected to contact 58 which is electrically connected to contact 52. Further in the off position of switch S2 the electrical connection between contact 60 and the reference point 56 will be opened.

Hence, in the embodiment of the invention illustrated in FIG. 2, when the on-off switch S2 is turned on contacts 48 will close and the operation of the voltage doubler circuit and the filament circuit will be the same electrically as the power supply illustrated in FIG. 1. That is, reference point 50 will be connected to contact 54 so that the full A.C. 110 volt 60 cycle alternating current will be applied across the filaments $f_1$ through $f_{13}$ and the filament for the picture tube $f_p$ along with the limiting resistor R2. Further, the reference point 56, that is, the cathode of the diode D2 will be connected to the contact 60 so that the diode D2 along with the capacitor C3 will operate in the same manner as described above for the power supply in FIG. 1. Likewise, it can be seen that the remainder of the circuit will be the electrical equivalent of the power supply illustrated in FIG. 1. When the television set is turned off by switch S2 opening contacts 48, 52 and 60, the reference point 50 will be electrically connected to contact 52 and the contact 58 will be connected to the cathode of diode D2, through point 56, as shown in FIG. 2 so as to provide a rectified half wave pulsating current through the filaments. Further, since the contacts 48 are opened there will be no current supplied to the power supply diode D1 in the filter from conductor 46 and by disconnecting reference point 56 from contact 60 there will be no current path between the filament circuit or the anode of diode D2 through the power supply rectifier D1. Hence, by opening the contacts 48 and also disconnecting the cathode of diode D2 from the anode of power supply diode D1, the plate voltage will be removed from the tubes, while inserting the diode D2 into the filament circuit to reduce the filament power to one-half in this circuit.

Hence, it is seen by the simple addition of only a few contacts from a single switch, a diode of a voltage doubler power supply can form the dual purpose of the conventional usage as a power supply diode as well as a means for reducing the power through the filaments of the tubes when the set is turned off. This double duty utilization of the diode of the voltage doubler enables the construction of a transformerless power supply having a D.C. potential approximately twice that of the line voltage and also enables the tubes of the set to have a longer life by eliminating the detrimental effects to the cathodes caused by turning the sets off and on. In addition, the almost immediate appearance of the picture and sound on the television set is realized.

While the present invention has been described with reference to various specific embodiments only, it will be obvious to those skilled in the art that it is not so limited but is susceptible to various changes and modifications without departing from the spirit and scope thereof.

I claim as my invention:

1. A power supply for a television receiver having a plurality of vacuum tubes with heaters, a source of alternating current, said heaters connected to form the heater circuit, said heater circuit operatively connected to said source to provide a bidirectional current path therewith, a unidirectional current device and a filter operatively connected to said source to conduct current from said source of a first polarity, capacitance means and another unidirectional current device operatively connected to said source to conduct current from said source of an opposite polarity for storing energy in said capacitor means, said capacitor means responsive to current from said source of said first polarity to discharge through said unidirectional current device and said filter, and switch means to selectively (1) disconnect said other unidirectional current device from said capacitance means and connect said other unidirectional current device to said heater circuit in series with said source to apply reduced power to said heaters, and (2) disconnect said unidirectional current device from said source.

2. A power supply for a television receiver having a plurality of vacuum tubes with heaters, a source of alternating current, said heaters connected to form a heater circuit, said heater circuit operatively connected to said source to provide a bi-directional current path therewith, a first diode and a filter operatively connected to said source to conduct current from said source of a first polarity, a capacitor and a second diode operatively connected to said source to conduct current of a second polarity for storing energy in said capacitor, said capacitor being responsive to current from said source of the first polarity to discharge through said first diode and said filter, and switch means to selectively (1) disconnect said second diode from said capacitor and connect said second diode to said heater circuit in series with said source to apply reduced power to said heaters, and (2) disconnect said first diode from said source.

References Cited by the Examiner

UNITED STATES PATENTS 2,683,805 7/54 Fyler ---------------- 328—258

GEORGE N. WESTBY, *Primary Examiner.*